(12) United States Patent
Tanaka

(10) Patent No.: US 8,237,849 B2
(45) Date of Patent: Aug. 7, 2012

(54) IMAGE-PICKUP APPARATUS

(75) Inventor: Shuya Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 762 days.

(21) Appl. No.: 11/833,836

(22) Filed: Aug. 3, 2007

(65) Prior Publication Data

US 2008/0036902 A1  Feb. 14, 2008

(30) Foreign Application Priority Data

Aug. 11, 2006  (JP) ................. 2006-219818

(51) Int. Cl.
*H04N 5/232* (2006.01)
*G03B 13/00* (2006.01)

(52) U.S. Cl. ..................... 348/353; 348/348

(58) Field of Classification Search .......... 348/345–357; 396/89–152

See application file for complete search history.

(56) References Cited

U.S. PATENT DOCUMENTS

| | | | | |
|---|---|---|---|---|
| 2002/0080257 A1* | 6/2002 | Blank | .................. | 348/345 |
| 2004/0057712 A1* | 3/2004 | Sato et al. | .................. | 396/89 |

FOREIGN PATENT DOCUMENTS

| | | |
|---|---|---|
| JP | 02-004088 A | 1/1990 |
| JP | 09-080296 A | 3/1997 |
| JP | 09-222554 A | 8/1997 |
| JP | 2006-003428 A | 1/2006 |
| JP | 2006-023653 A | 1/2006 |
| JP | 2006-093852 A | 4/2006 |

* cited by examiner

*Primary Examiner* — Chieh M Fan
*Assistant Examiner* — Dillon Durnford Geszvain
(74) *Attorney, Agent, or Firm* — Canon USA Inc IP Division

(57) ABSTRACT

An image-pickup apparatus is disclosed which is capable of realizing a focus-effect function in a constant time without being influenced by contrast of an object or the position of a focus lens. The apparatus includes a signal generator which generates a focus evaluation signal, a detector which detects information corresponding to an object distance, and a controller which performs focus lens control on the basis of the focus evaluation signal and focus lens control on the basis of information corresponding to the object distance. The controller determines a direction and a velocity in which the focus lens is moved toward an in-focus position on the basis of the information corresponding to the object distance in the focus lens control according to the focus-effect function. The controller performs the focus lens control on the basis of the focus evaluation signal after the focus lens is moved in the determined direction.

11 Claims, 14 Drawing Sheets

<< FOCUS-IN >>

<< FOCUS-IN >>

<< RACK FOCUS >>

IMAGE-PICKUP APPARATUS

BACKGROUND OF THE INVENTION

1. Field of the Invention

The present invention relates to an image-pickup apparatus, such as a video camera, which controls a focus lens.

2. Description of the Related Art

Autofocus (AF) methods include a contrast (climbing) AF method which is practically used. In the contrast AF method, a high-frequency component (hereinafter referred to as an AF evaluation value) is extracted from an image-pickup signal output from an image-pickup element and a lens position where the AF evaluation value becomes the largest is detected to perform an in-focus operation.

A video camera has been disclosed which has a focus-effect function, that is, which is capable of performing "effect photography" such as "focus-in", "focus-out" and "rack focus (or shift focus)" by utilizing this type of AF method (see Japanese Patent No. 2702968). The focus-in is an operation of focusing gradually from an out-of-focus state, and the focus-out is an operation of defocusing gradually from an in-focus state. These focus-in and focus-out are used in depicting a scene of childhood recollections, dream sequence and a scene of reminiscence.

Further, the rack focus is an operation of intentionally shifting the focal point from a near object to a far object or from the far object to the near object, which is used in providing a visual effect such that the focal point in the image-pickup area is changed to lead viewer's eye.

In the above-described conventional example, to perform the focus-in, the focus-in operation is activated by changing over to the contrast AF after an out-of-focus state is realized by manual focus. However, in the contrast AF, the out-of-focus state is of a low AF evaluation value, so that it is necessary to find out a maximum value of the AF evaluation value from the beginning.

Further, since there is a difference in variation of the AF evaluation value depending on the contrast of an object, an in-focus state is not achieved in a constant time, thereby making it impossible to manage an effect-generating time. In the case of the rack focus as well, the contrast AF requires a climbing operation for finding out an adjacent position where a maximum value of the AF evaluation value is obtained, thereby making it impossible to manage the effect-generating time. As described above, there is a case where the focus-in is attained earlier depending on an object while there is a case where the focus-in is not attained smoothly.

Further, in the above-described conventional example, the focus-out operation is activated by moving a lens position to a near side in a case where the focus lens is located at an infinite side and by moving the lens position to the infinite side in a case where the focus lens is located at the near side. However, if the lens position is at the center or in the vicinity thereof, the lens is not always moved in an out-of-focus direction without fail.

BRIEF SUMMARY OF THE INVENTION

The present invention provides an image-pickup apparatus which is capable of realizing a focus-effect function in a constant time without being influenced by contrast of an object or the position of a focus lens.

The present invention according to an aspect provides an image-pickup apparatus includes a signal generator which generates a focus evaluation signal corresponding to contrast of an image from an output signal of an image-pickup element, a detector which detects information corresponding to an object distance, and a controller which performs focus lens control on the basis of the focus evaluation signal and focus lens control on the basis of information corresponding to the object distance. The controller is capable of performing the focus lens control according to a focus-effect function. The controller determines a direction and a velocity in which the focus lens is moved toward an in-focus position on the basis of the information corresponding to the object distance in the focus lens control according to the focus-effect function. The controller performs the focus lens control on the basis of the focus evaluation signal after the focus lens is moved in the determined direction.

Other aspects and features of the present invention will be made clear by the embodiments explained with reference to the following drawings.

DETAILED DESCRIPTION OF THE EMBODIMENTS

Hereinafter, a description will be made of the embodiments of the present invention with reference to drawings.

Figure 1:
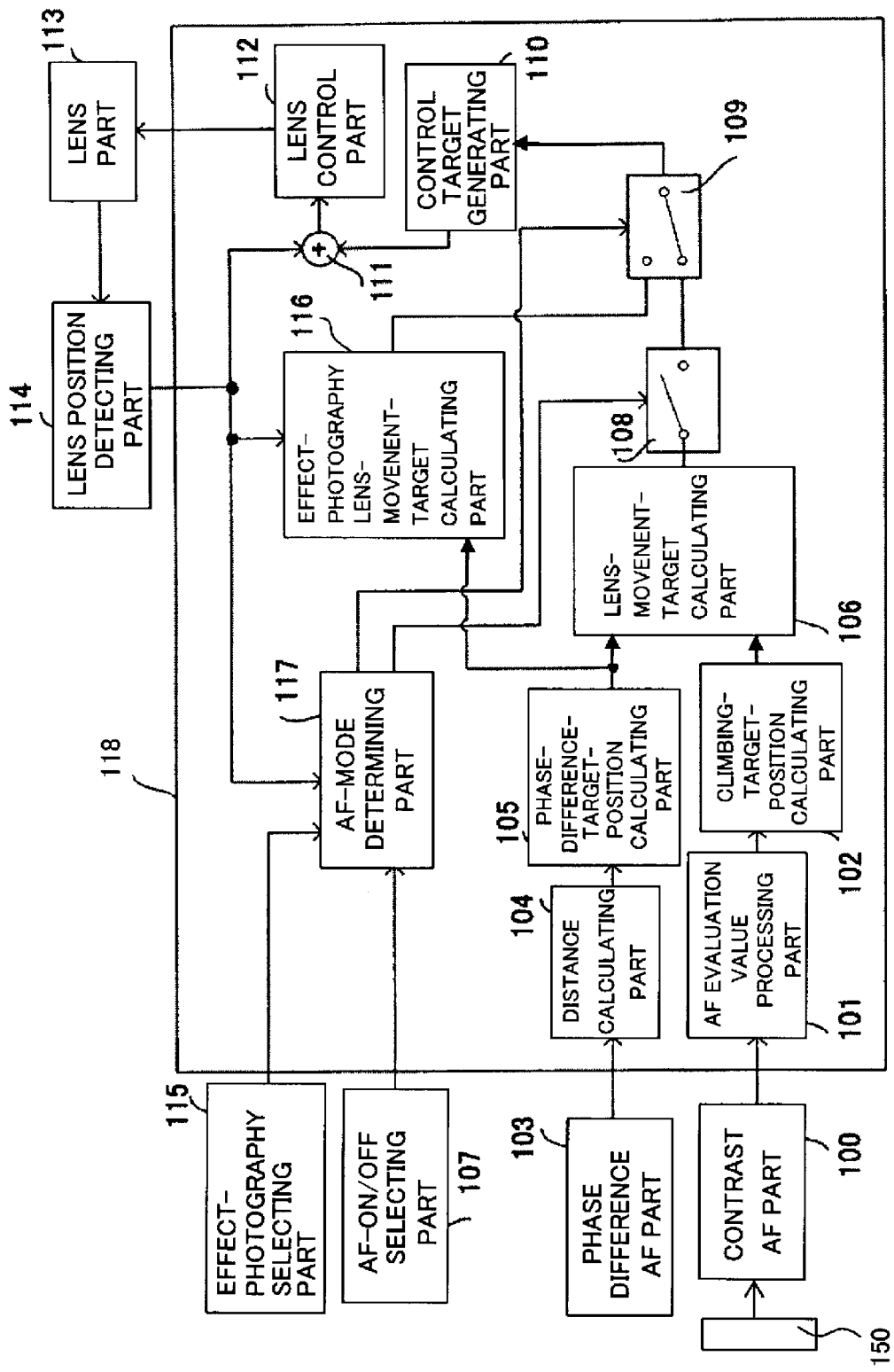
FIG. 1 is a block diagram showing an example circuit configuration of an image-pickup apparatus that is an embodiment of the present invention.

FIG. 1 is a block diagram showing an example circuit configuration of an image-pickup apparatus which is Embodiment 1 of the present invention. The image-pickup apparatus is equipped with a focus control system described below.

AF methods include, in addition to the contrast AF, a phase-difference detection AF method in which a defocus amount to an in-focus position is calculated and then a focus lens (hereinafter merely referred to as a lens) is driven to an in-focus position. Further, AF methods include an external-ranging AF method in which the principle of triangulation is used to measure a distance to an object and then an operation for focusing on the object is performed. These AF methods detect information corresponding to an object distance. Then, unlike the contrast AF, they do not require a scanning operation which extracts an AF evaluation value, thereby making it possible to attain an in-focus operation faster than the contrast AF.

Further, AF methods include a so-called called hybrid AF method in which the contrast AF and the phase-difference detection AF method or the external-ranging AF method are combined. The image-pickup apparatus of the present embodiment given below is to provide the focus control of the hybrid AF.

In FIG. 1, reference numeral 100 denotes a contrast AF part which photoelectrically converts an object image with an image-pickup element 150 such as a CCD sensor and a CMOS sensor and outputs an image-pickup signal. Reference numeral 101 denotes an AF evaluation value processing part which generates an AF evaluation value (focus evaluation signal) for performing AF control by the contrast (climbing) AF method from the image-pickup signal output from the contrast AF part 100 and outputs the AF evaluation value. The AF evaluation value processing part 101 filters the image-pickup signal to extract only a predetermined high-frequency component, performing processing such as peak hold and integration, thereby generating the AF evaluation value.

Reference numeral 102 denotes a climbing-target-position calculating part which changes a climbing-target lens position to a peak position of the AF evaluation value while determining whether the AF evaluation value is increased or decreased. The climbing-target-position calculating part 102 reverses a direction of the climbing-target lens position in a case where the AF evaluation value is decreased. Thereby, the climbing-target-position calculating part 102 changes the climbing-target lens position with an algorithm which determines the passage of the peak position by detecting that the AF evaluation value is decreased after the AF evaluation value increases.

Reference numeral 103 denotes a phase-difference AF part which outputs a phase-difference signal representing a phase-difference amount of two object images formed on a phase-difference detecting sensor for the external ranging AF method. The two images are formed with two divided light fluxes from the object.

Reference numeral 104 denotes a distance calculating part which calculates the distance to the object by the principle of triangulation with reference to the phase-difference signal. The principle of triangulation, that is, the principle of distance calculation is well-known, so that the description thereof will be omitted. Reference numeral 105 denotes a phase-difference-target-position calculating part which calculates a phase-difference-target lens position from the calculated distance.

Reference numeral 106 denotes a lens-movement-target calculating part which calculates a target lens position and a target lens velocity from the climbing-target lens position and the phase-difference-target lens position respectively calculated by the climbing-target-position calculating part 102 and the phase-difference-target-position calculating part 105.

This hybrid AF uses the phase-difference target lens position obtained by the phase-difference AF method when the contrast of the object is low or the defocus amount is great, and changes to use of the climbing-target lens position obtained by the contrast AF method when the lens position comes close to an in-focus position so as to satisfy a predetermined changeover condition.

Reference numeral 107 denotes an AF-on/off selecting part which allows a user to select manual focus or auto focus. The user can operate a menu screen or a changeover button, thereby indicating the manual focus or the auto focus.

Reference numeral 108 denotes an AF-on/off switch for turning on and off of the update of the target lens position and the target lens velocity that are set at a control-target generating part 110, described later. The on and off of the switch 108 is controlled by an AF mode determining part 117 to be described later.

Reference numeral 109 denotes an AF-changeover switch which allows a changeover between normal auto focus and a focusing operation for the effect photography. The on and off of the switch 109 is controlled by the AF mode determining part 117. Reference numeral 110 denotes a control-target generating part which generates a target value that changes to a set value at a velocity corresponding to the set velocity.

Reference numeral 111 denotes an error calculator which compares a current lens position detected by a lens position detecting part 114, described later, with a target lens position from the control target generating part 110 to calculate a position error. Reference numeral 112 denotes a lens control part which filters the position error to output a lens driving signal so as to reduce the position error to zero.

Reference numeral 113 denotes a lens part constituted by a lens, a motor driver and a driving member such as a motor. The lens part 113 moves the lens according to a lens driving signal. Reference numeral 114 denotes a lens-position detecting part which outputs a lens position signal according to the movement of the lens. Reference numeral 115 denotes an effect-photography selecting part which makes it possible to select normal photography or effect photography with focus-effect functions such as focus-in, focus-out and rack focus. A user can operate a changeover button or others, thereby indicating the normal photography or the effect photography.

Reference numeral 116 denotes an effect-photography-lens movement-target calculating part which calculates a target lens position and a target lens velocity for the effect photography.

Reference numeral 117 denotes an AF-mode determining part which controls the AF-on/off switch 108 and the AF-changeover switch 109 according to the lens position and the selections in the AF-on/off selecting part 107 and the effect-photography selecting part 115. Reference numeral 118 denotes a lens-controlling microcomputer which is connected with the AF-on/off selecting part 107, the effect-photography selecting part 115, the contrast AF part 100, the phase-difference AF part 103, the lens part 113 and the lens position detecting part 114 through its ports to control this lens system in an integrated manner.

Figure 2:
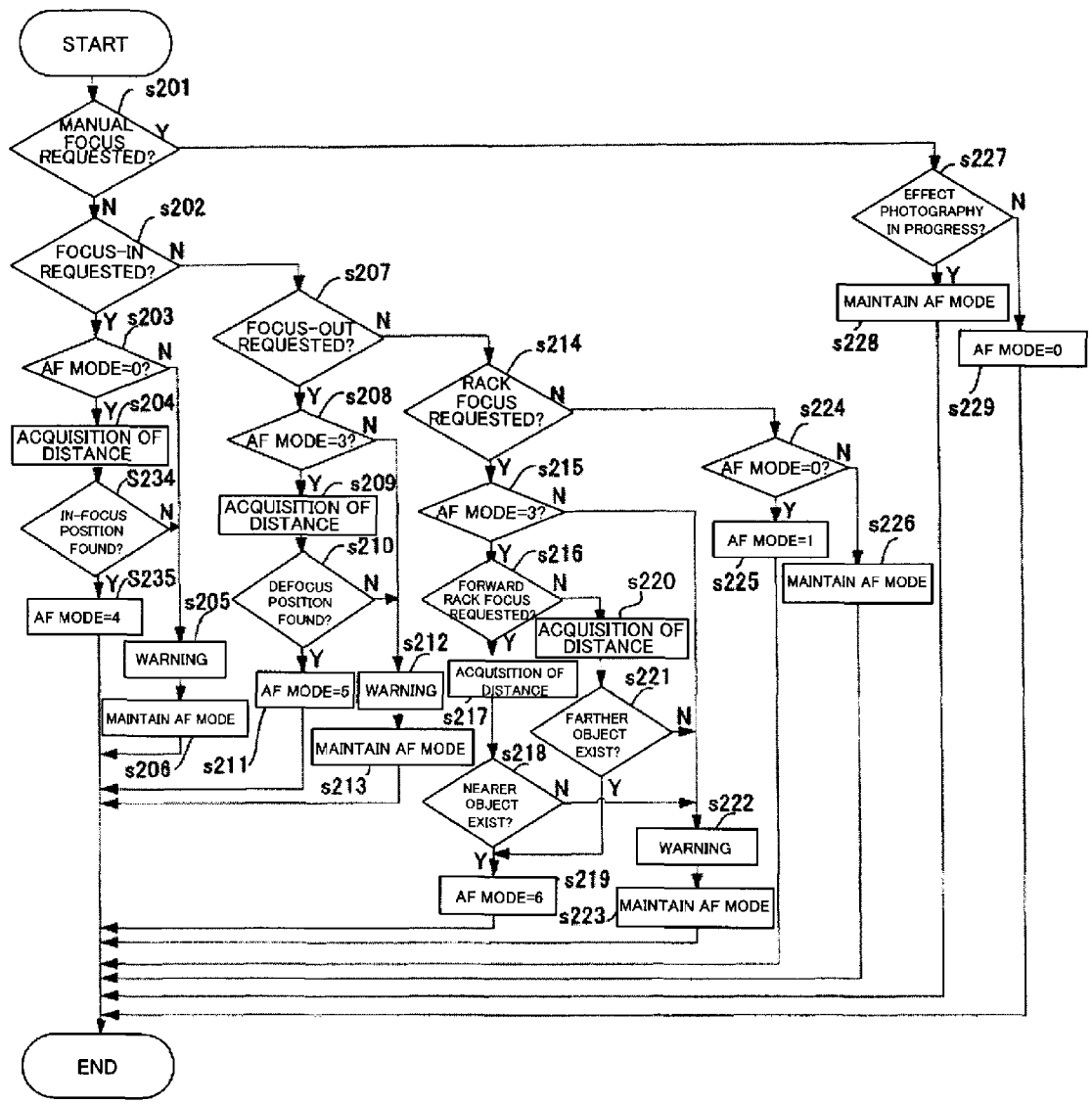
FIG. 2 is a flowchart showing example operations in determining an AF mode in the embodiment.

FIG. 2 is a flowchart showing example procedures in which the AF-mode determining part 117 inside the lens-controlling microcomputer 118 periodically monitors instructions for various types of image pickup given by a user through the operation of the changeover button and others to determine the AF mode.

Figure 3:
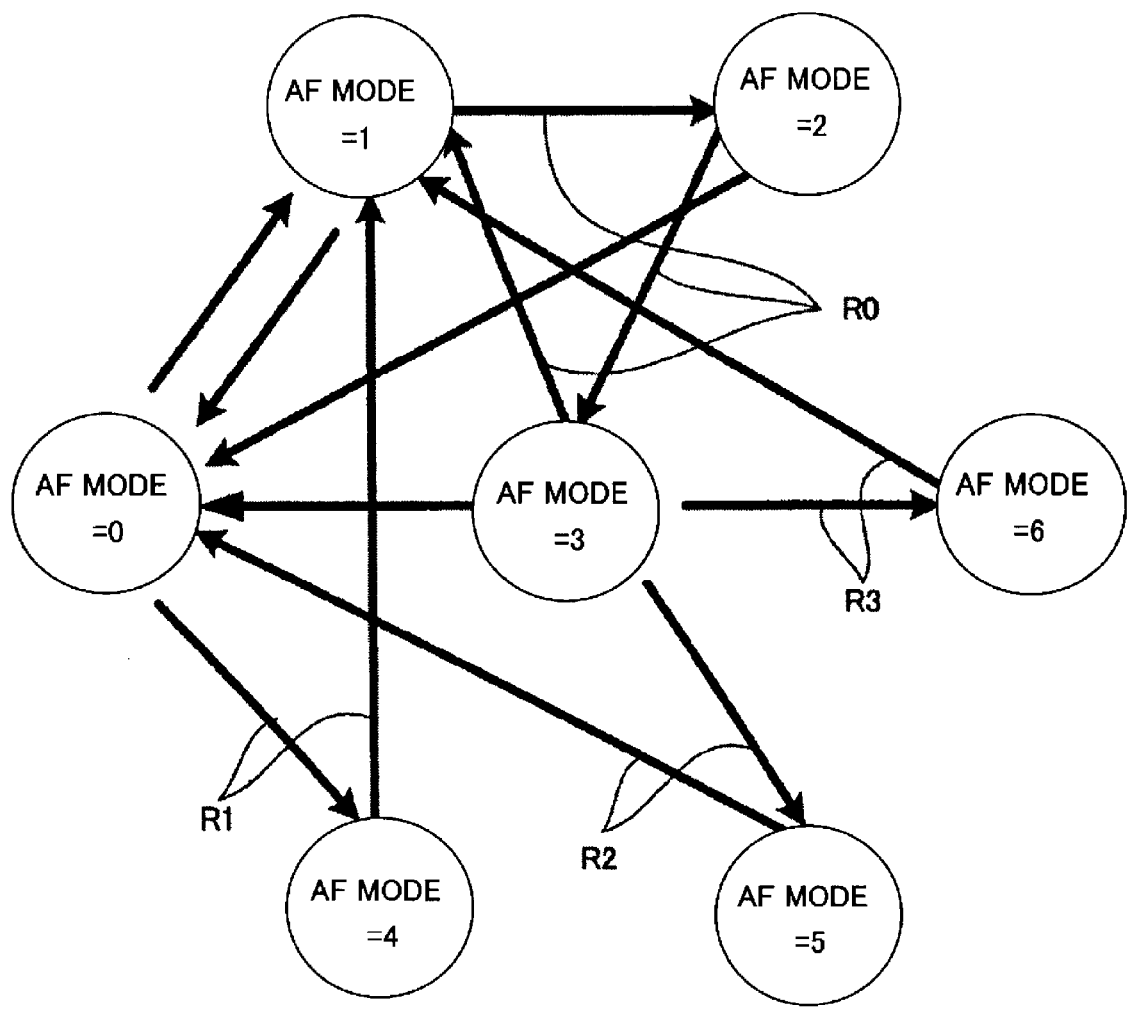
FIG. 3 is a figure showing an example transition of the AF mode of the embodiment.

FIG. 3 is a chart showing the transition of AF mode in the present embodiment, in which each circle represents an AF mode and the arrow R0 represents the transition of AF mode according to a conventional hybrid AF. Also in FIG. 3, the arrow R1 represents the transition of AF mode based on the focus-in, the arrow R2 represents the transition of AF mode based on the focus-out, and the arrow R3 represents the transition of AF mode based on the rack focus. Further, the AF mode 0 represents the manual focus, the AF mode 1 represents the phase-difference AF, the AF mode 2 represents the contrast AF, and the AF mode 3 represents an in-focus state (the lens is stopped at the peak position of the AF evaluation value).

Still further, the AF mode 4 represents the focus-in, the AF mode 5 represents the focus-out, and the AF mode 6 represents the rack focus.

Figure 4A:
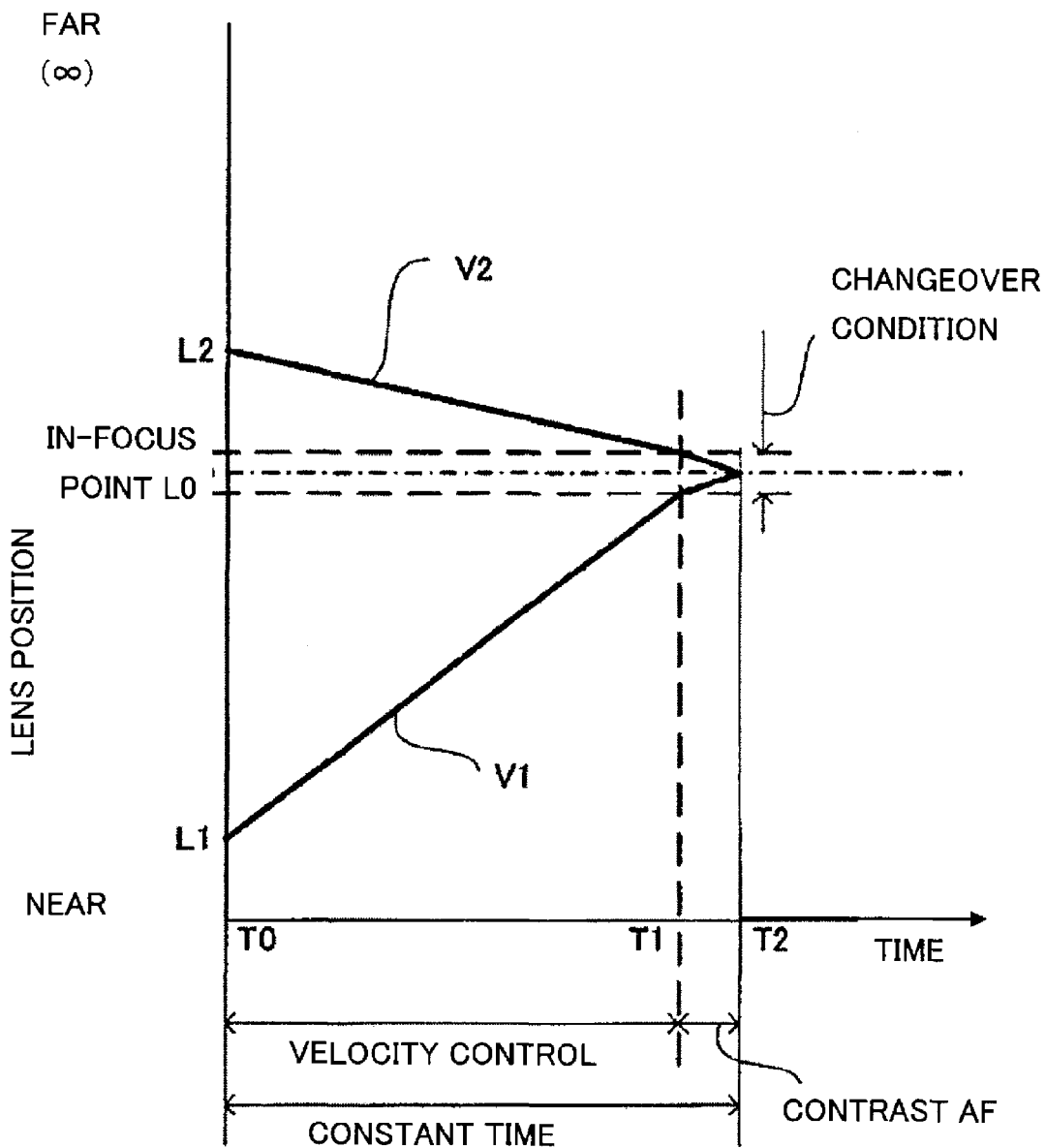
FIGS. 4A and 4B are figures for explaining focus-in of the embodiment.
Figure 4B:
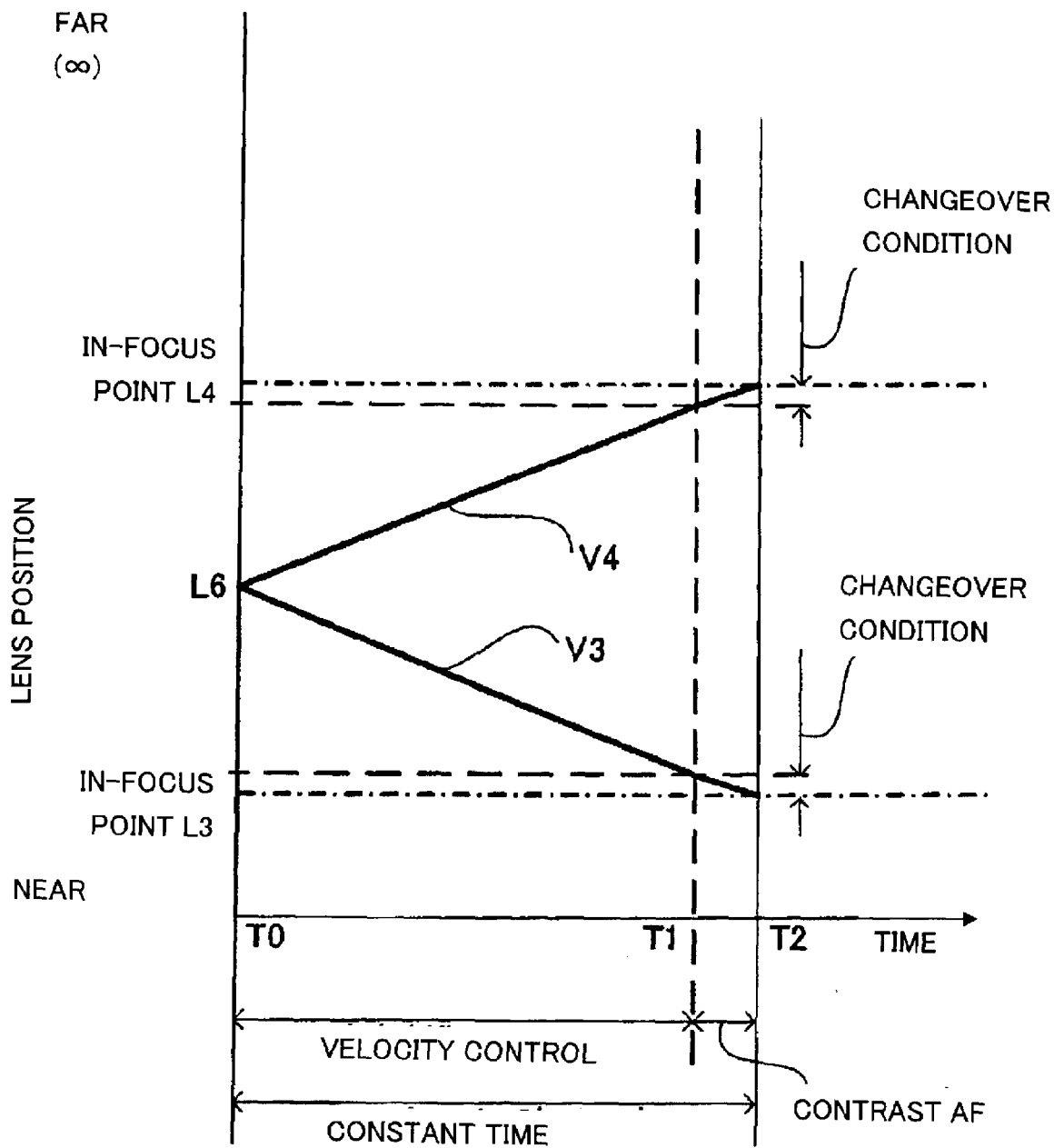
Figure 5A:
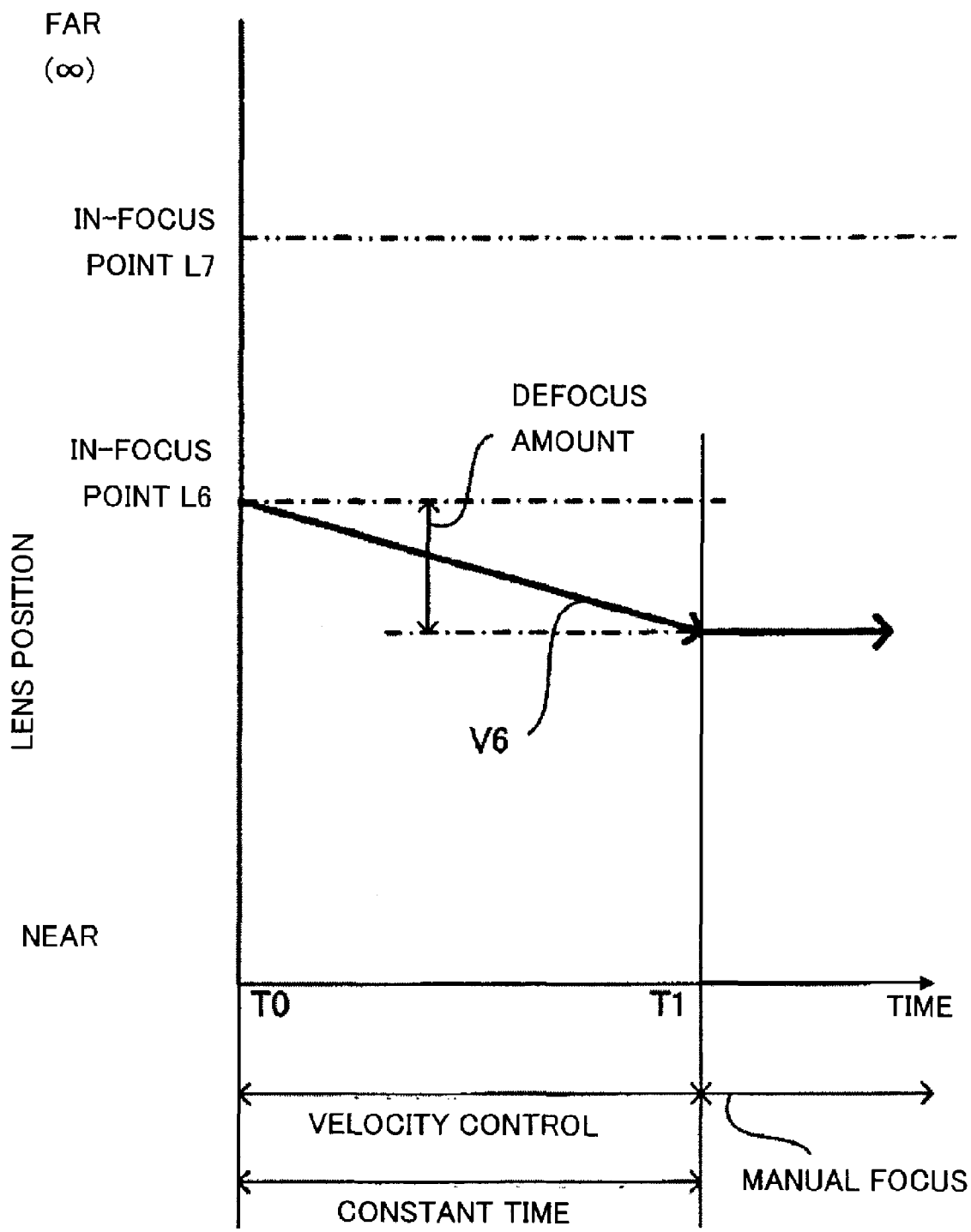
FIGS. 5A and 5B are figures for explaining focus-out of the embodiment.
Figure 5B:
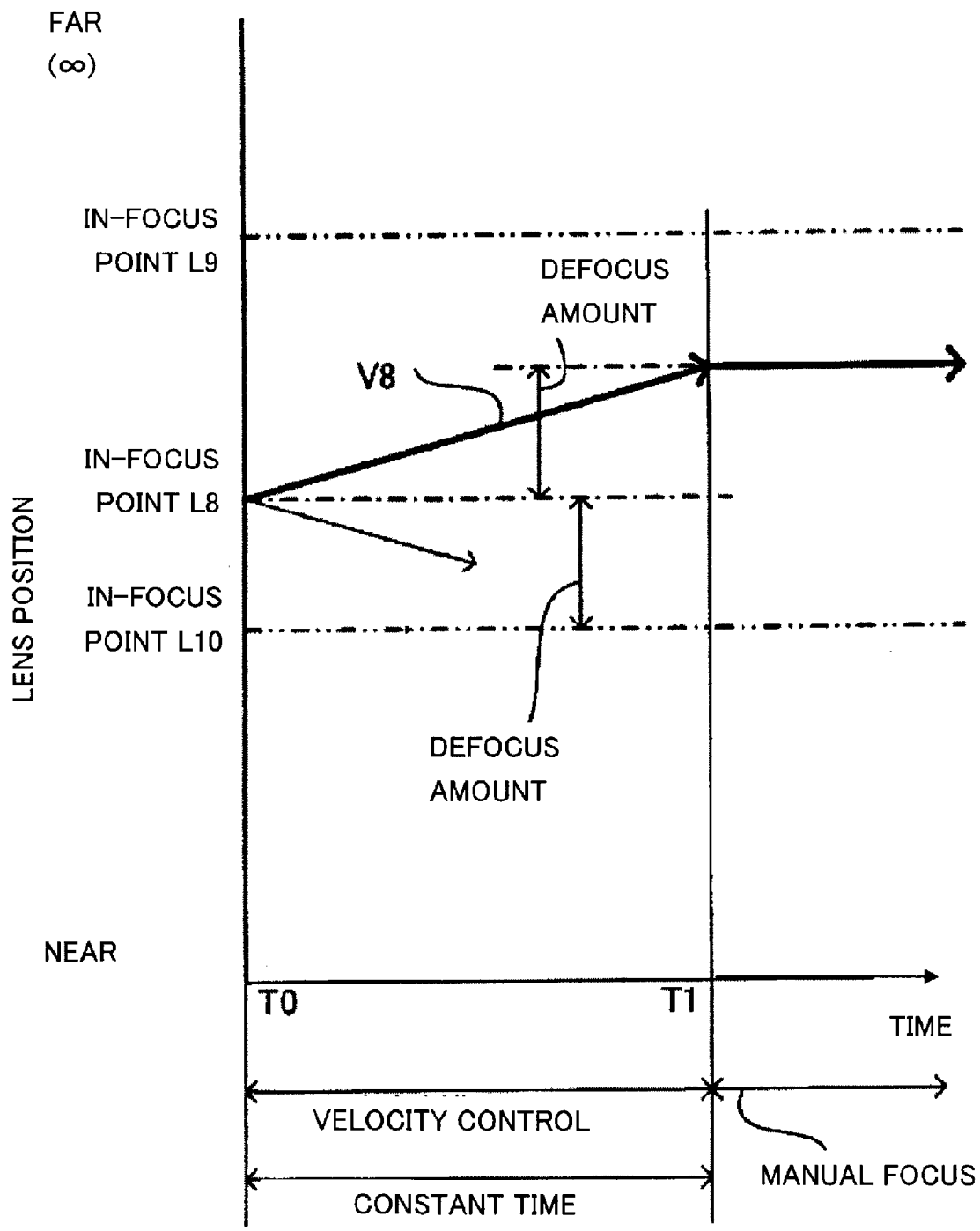

FIGS. 4A and 4B show the operations in the focus-in. The horizontal axis thereof represents times and the vertical axis thereof represents lens positions. FIGS. 5A and 5B show the operations in the focus-out. The horizontal axis thereof times and the vertical axis thereof represents lens positions. FIGS.

6A, 6B and 6C show the operations in the rack focus. The horizontal axis thereof times and the vertical axis thereof represents lens positions.

Next, a description will be made of the operation (processes) in the AF-mode determining part 117 according to the flowchart shown in FIG. 2 with reference to above-described FIG. 3 to FIG. 6B.

In Step s201, the AF-mode determining part 117 determines first whether or not a request for changeover to the manual focus is made. If the request is made, the process proceeds to Step s227. If the request for changeover to the manual focus is not made, the process proceeds to Step s202.

In Step s202, the AF-mode determining part 117 determines whether or not the focus-in of the effect photography is requested. If the focus-in is requested, the process proceeds to Step s203, and if it is not requested, the process proceeds to Step s207.

When the process proceeds to Step s203 on the basis of the determination that the focus-in is requested, the AF-mode determining part 117 determines whether or not the current AF mode is 0 (manual focus). If the AF mode is the manual focus, the process proceeds to Step s204. If the mode is not the manual focus, the process proceeds to Step s205.

In Step s205, the AF-mode determining part 117 displays a warning for rejecting the request. This is because, as will be shown later in FIG. 7, the transition to the AF mode of the focus-in is permitted only from an out-of-focus (defocused) state previously produced by the manual focus.

Further, a combination of the focus-in with the focus-out, described later, makes it possible to automatically transit from the AF mode 3 (in-focus state) to the AF mode 5 (focus-out) to perform the focus-in after an out-of-focus state is produced. Further, the request for the focus-in can cause a recording device to operate as a record-starting signal.

When the process proceeds to Step s204 on the basis of a determination that manual focus is selected, the AF-mode determining part 117 acquires information on a distance to an object by the phase-difference AF method.

In the next Step s234, the AF-mode determining part 117 determines which direction the lens is moved to obtain the effect of the focus-in with reference to the current lens position and the distances to near and far adjacent objects. In other words, the AF-mode determining part 117 determines which direction the in-focus position is located. If the in-focus position is not found, the process proceeds to Step s205, and if the in-focus position is found, the process proceeds to Step s235.

As shown in FIG. 4A, since an object distance can be detected in advance by the phase-difference AF method, even when the current lens positions L1 and L2 are different in distance or direction to the in-focus point L0, it is possible to determine the velocities V1 and V2 for the current lens positions L1 and L2 such that the time length for the focus-in (focus-in time) is constant.

As shown in FIG. 4B, in a case where the current lens position L6 is at the midpoint between in-focus points L3 and L4 adjacent to the current lens position, even such a determination cannot be made that the current lens position L6 is at the middle of them only by the contrast AF. However, according to the present embodiment, a determination of the velocities V3 and V4 can be made such that the focus-in time is constant with reference to the information on the distance acquired by the phase-difference AF method. The direction in which the lens is moved when two in-focus points exist can be determined by selecting in advance a priority for a far point or a near point in a menu or by selecting in the effect-photography selecting part 115.

Returning to FIG. 2, when the AF-mode determining part 117 determines in the above-described Step s234 that the in-focus position is found, the process proceeds to Step s235. The AF-mode determining part 117 sets the AF mode 4 (focus-in) and then completes the processes.

When the AF-mode determining part 117 determines that the current AF mode is not 0 (manual focus) in the above-described Step s203, or that the in-focus position is not found in the above-described Step s234, the process proceeds to Step s205. In this Step s205, the AF-mode determining part 117 displays a warning for rejecting the request. In the next Step s206, the AF-mode determining part 117 maintains the current AF mode and then completes the processes.

Further, when the process proceeds to Step s207 on the basis of a determination that the focus-in is not requested in the above-described Step s202, the AF-mode determining part 117 determines whether or not the focus-out of the effect photography is requested. If the focus-out is requested, the process proceeds to Step s208, and if it is not requested, the process proceeds to Step s214.

When the process proceeds to Step s208 on the basis of a determination that the focus-out is requested, the AF-mode determining part 117 determines whether or not the current AF mode is 3 (that is, the lens is stopped at the peak position of the AF evaluation value). If the lens is stopped at the peak position of the AF evaluation value, the process proceeds to Step s209. Further, if the lens is not stopped at the peak position of the AF evaluation value, the process proceeds to Step s212 where a warning is displayed for rejecting the request, as will be described later. This is because, as shown in FIG. 3, the transition to the AF mode of the focus-out is permitted only from the AF mode 3 (in-focus state) in order to obtain a defocusing effect.

However, to obtain a greatly defocused state from a slightly defocused state, the AF mode 3 is not necessarily requested. Such an effect can be obtained when the transition from an AF mode other than the AF mode 3 is permitted.

When the process proceeds to Step s209 on the basis of a determination that the lens is stopped at the peak position of the AF evaluation value, the AF-mode determining part 117 acquires information on the distance to the object by the phase-difference AF method. In the next Step s210, the AF-mode determining part 117 determines which direction the lens is moved to obtain the defocusing effect with reference to the current focus position and the distances to near and far adjacent objects. In other words, the AF-mode determining part 117 determines whether or not any defocus position is found. If the defocus position is not found, the process proceeds to Step s212, and if the defocus position is found, the process proceeds to Step s211.

As shown in FIG. 5A, the object distance can be detected in advance by the phase-difference AF method. Therefore, when the focus-out is performed from the in-focus point L6, it is possible to determine the velocity V6 so as to perform the focus-out only by a predetermined defocus amount on the side opposite to the in-focus point L7. As shown in FIG. 5B, when a plurality of object positions (in-focus points) L9 and L10 adjacent to the current lens position L8 exist, it is impossible to determine a defocusing direction without fail only by the contrast AF method.

However, in the present embodiment, the object distance can be detected in advance by the phase-difference AF method as described above. Therefore, even when the adjacent in-focus points L9 and L10 exist, a determination can be made that a direction in which the focus-out can be performed by a predetermined defocus amount is the direction of the in-focus point L9. As a result, the velocity V8 can be determined such that the time length for the focus-out (focus-out time) is constant.

Returning to FIG. 2, when the process proceeds to Step s211 on the basis of a determination that any defocus position is found, the AF-mode determining part 117 sets the AF mode 5 (focus-out) and then completes the processes. On the other hand, when the process proceeds to Step s212 on the basis of a determination that the defocus position is not found, the AF-mode determining part 117 displays a warning for rejecting the request. If the defocus position is not found in any movement direction, it is also possible to output a warning. In the next Step s213, the AF-mode determining part 117 maintains the current AF mode and completes the processes.

When the process proceeds to Step s214 on the basis of a determination that the focus-out is not requested in the above-described Step s207, the AF-mode determining part 117 determines whether or not the rack focus of the effect photography is requested. If the rack focus is requested, the process proceeds to Step s215, and if it is not requested, the process proceeds to Step s224.

When the process proceeds to Step s215 on the basis of a determination that the rack focus is requested, the AF-mode determining part 117 determines whether or not the current AF mode is 3 (the lens is stopped at the peak position of the AF evaluation value). If the lens is stopped at the peak position of the AF evaluation value, the process proceeds to Step s216. Further, if the lens is not stopped at the peak position of the AF evaluation value, the process proceeds to Step s222. This is because, as shown in FIG. 3, the transition to the AF mode of the rack focus is permitted only from the AF mode 3 (in-focus state) in order to prevent the lens from passing the in-focus point twice. However, the transition to the AF mode of the rack focus from an AF mode other than the AF mode 3 may be permitted.

When the process proceeds to Step s216 on the basis of a determination that the lens is stopped at the peak position of the AF evaluation value, the AF-mode determining part 117 determines whether forward rack focus is requested or not (rearward rack focus is requested). If the forward rack focus is requested, the process proceeds to Step s217, and if rearward rack focus is requested, the process proceeds to Step s220. Noted that the forward rack focus means focusing on a near object from a far object, and the rearward rack focus means focusing on a far object from a near object.

When the process proceeds to Step s217 on the basis of a determination that the forward rack focus is requested, the AF-mode determining part 117 acquires information on the object distance by the phase-difference AF. In the next Step s218, the AF-mode determining part 117 determines whether or not the object exists at a distance nearer than that corresponding to the current lens position. If the object exists nearer, the process proceeds to Step s219, and if not, the process proceeds to Step s222.

Figure 6A:
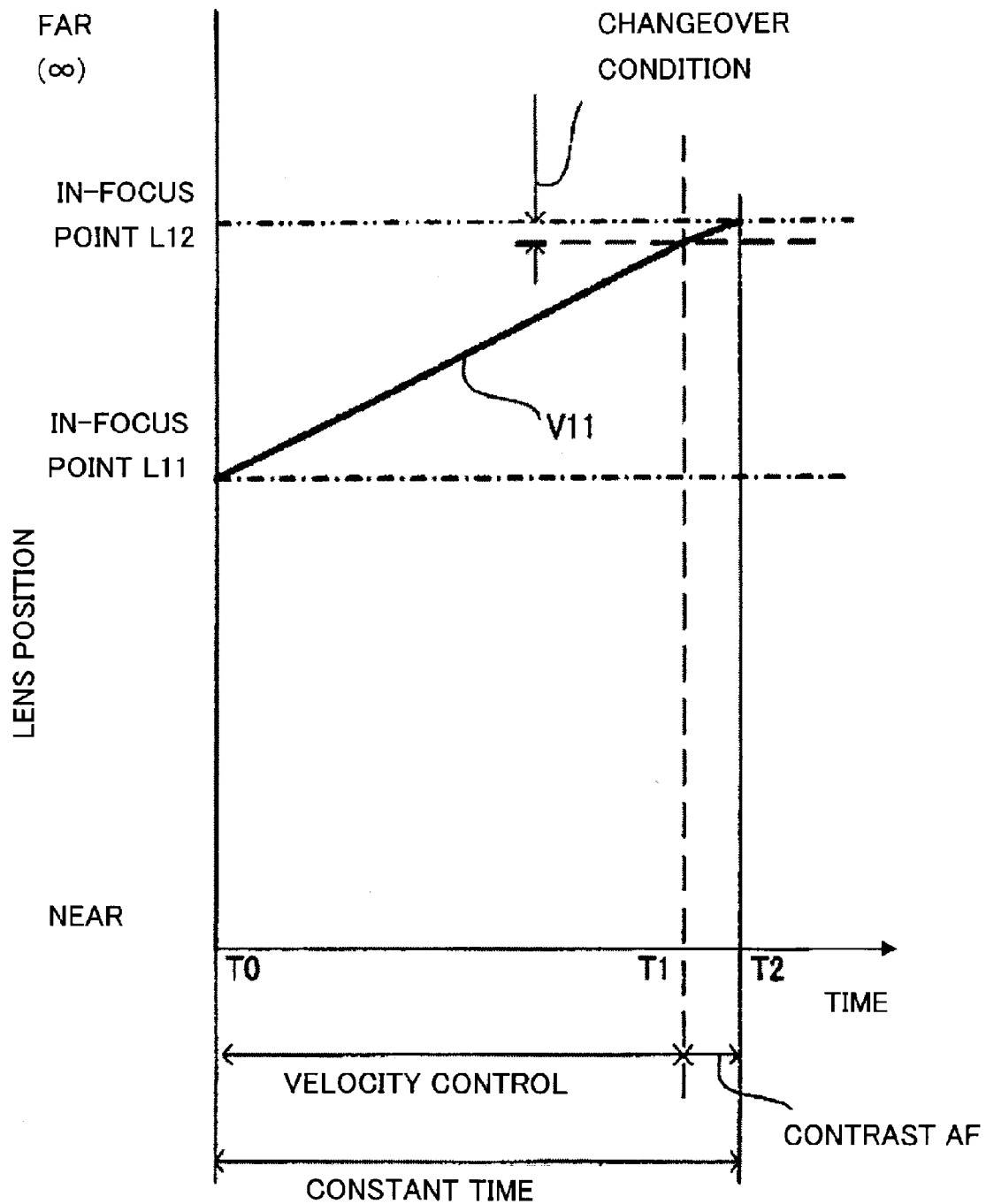
FIGS. 6A, 6B and 6C are figures for explaining rack focus of the embodiment.
Figure 6B:
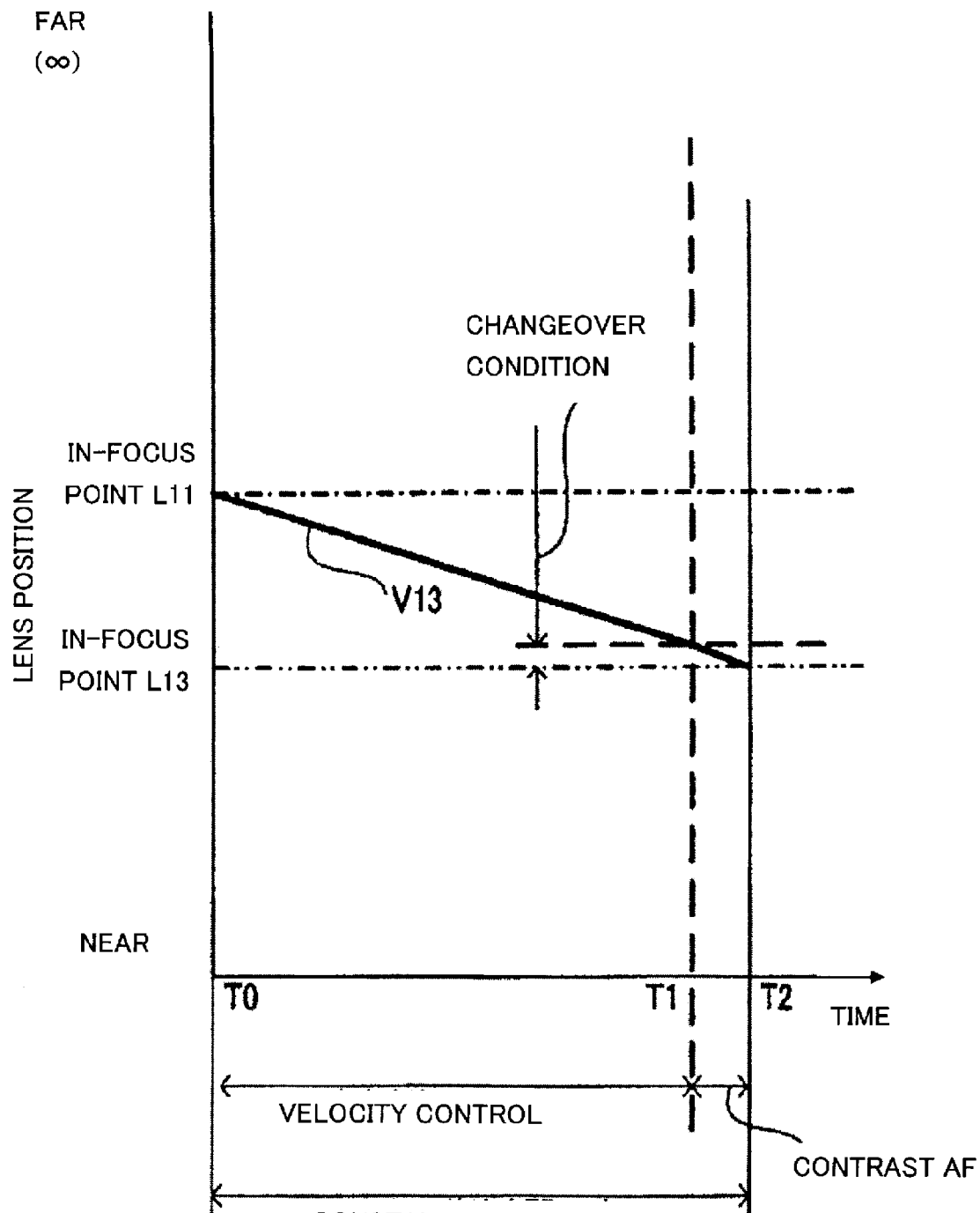

As shown in FIG. 6B, the object distance can be detected in advance by the phase-difference AF method. Therefore, it is possible to determine that the in-focus point L13 exists on the nearer side than the in-focus point L11 and also determine the velocity V13 such that the time length for the rack focus (rack focus time) is constant.

Returning to FIG. 2, when the process proceeds to Step s219 on the basis of a determination that the object exists at a distance nearer than that corresponding to the current focus position, the AF-mode determining part 117 sets the AF mode 6 (rack focus) and completes the processes.

When the AF-mode determining part 117 determines in the above-described Step s216 that the rearward rack focus is requested, the process proceeds to Step s220 where the AF-mode determining part 117 acquires information on the object distance by the phase-difference AF method. In the next Step s221, the AF-mode determining part 117 determines whether or not the object exists at a distance farther than that corresponding to the current lens position. If the object exists farther, the process proceeds to the above-described Step s219.

As shown in FIG. 6A, the object distance can be detected in advance by the phase-difference AF method. Therefore, it is possible to determine that the in-focus point L12 exists on the farther side than the in-focus point L11 and also determine the velocity V11 such that the rack focus time is constant.

Returning to FIG. 2, when an object does not exist at a distance farther than that corresponding to the current focus position, the process proceeds to Step s222 where the AF-mode determining part 117 displays a warning for rejecting the request. In the next Step s223, the AF-mode determining part 117 maintains the current AF mode and then completes the processes.

Figure 6C:
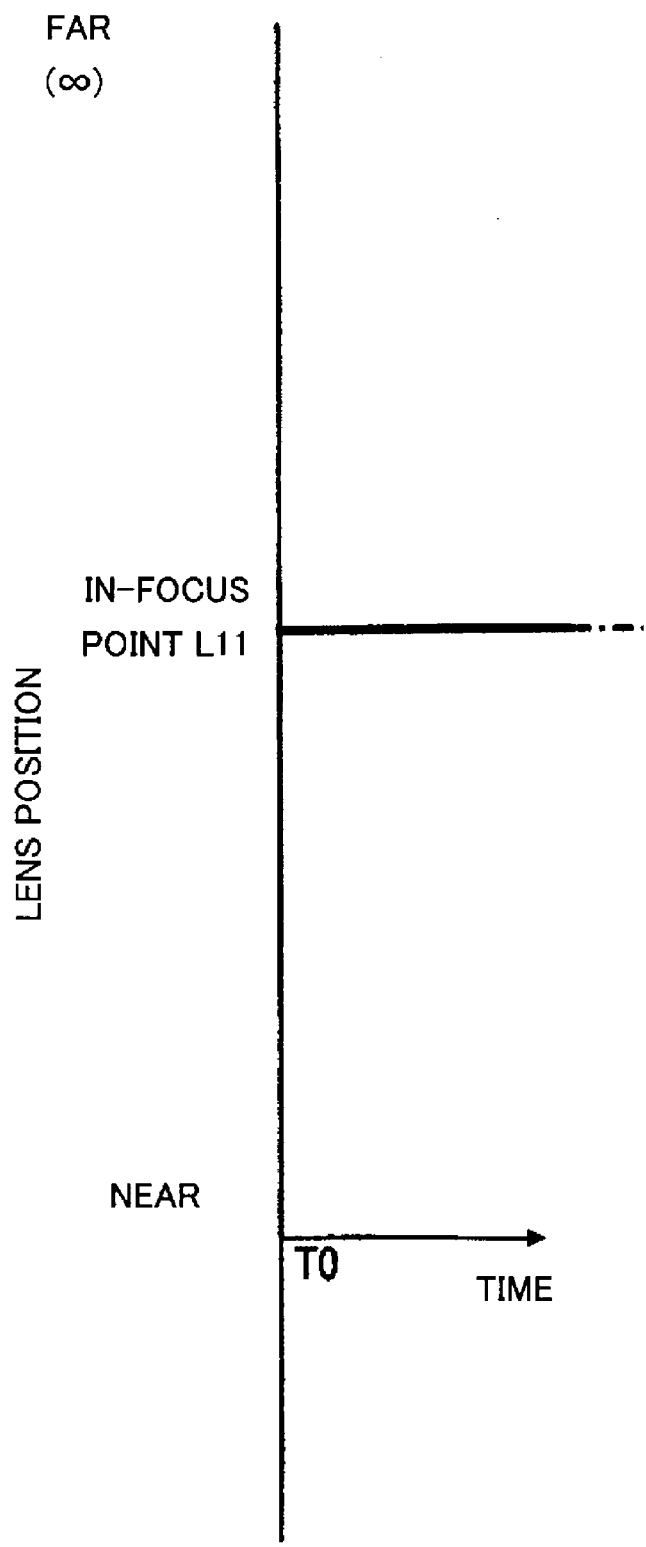

As shown in FIG. 6C, the object distance can be detected in advance by the phase-difference AF method. Therefore, it is possible to determine in advance that no in-focus point exists at all on the nearer side and the farther side than the in-focus point L11, which is the current lens position, and to output a warning.

Returning to FIG. 2, if there is no request for the manual focus and for the effect-photography, that is, if the auto focus is selected, the process proceeds to Step s224. In this Step s224, the AF-mode determining part 117 determines whether or not the current AF mode is the AF mode 0 (manual focus). If the current AF mode is the manual focus, the process proceeds to Step s225 where the AF-mode determining part 117 changes the AF mode from the manual focus to the phase-difference AF to activate the hybrid AF and then completes the processes. On the other hand, if the current AF mode is not the manual focus, the process proceeds to Step s226 where the AF-mode determining part 117 maintains the current AF mode since the hybrid AF is already in progress, and then completes the processes.

When the process proceeds to Step s227 on the basis of a determination that the request for changeover to the manual focus is made in the above-described Step s201, the AF-mode determining part 117 determines whether or not the effect photography is in progress. If the effect photography is in progress, that is, the current AF mode is the AF mode 4, 5 or 6, the process proceeds to Step s228. In the Step s228, the AF-mode determining part 117 maintains the current AF mode in order to prevent the transition to the manual focus until completion of the effect photography and then completes the processes. On the other hand, if the effect photography is not in progress, the process proceeds to Step s229 where the AF-mode determining part 117 sets the AF mode 0 (manual focus) and then completes the processes.

Next, with reference to the flowchart shown in FIG. 7, a description will be mage of the operation (processes) of the lens-controlling microcomputer (hereinafter merely referred to as the microcomputer) 118 on the transition of AF mode while periodically acquiring the object distance, the AF mode and the AF evaluation value.

First, in Step s301, the microcomputer 118 performs image-pickup signal processing to acquire an image-pickup signal from the contrast AF part 100 and a phase-difference detecting processing to acquire a phase-difference signal from the phase-difference AF part 103.

In the next Step s302, the microcomputer 118 acquires the AF evaluation value extracted from the image-pickup signal and the information on the object distance calculated from the detected phase difference and lens position.

In the subsequent Step s303, the microcomputer 118 determines whether or not the AF mode 0 (manual focus) is set. If the manual focus is set, the process returns to the Step s301, and if not, the process proceeds to Step s304.

When the process proceeds to Step s304 on the basis of a determination that the manual focus is not set, the microcomputer 118 determines whether or not the AF mode 1 (phase-difference AF) is set. If the phase-difference AF is set, the process proceeds to Step s305, and if not, the process proceeds to Step s309.

When the process proceeds to Step s305 on the basis of a determination that the phase-difference AF is set, the microcomputer 118 performs target-lens-position-calculating processing which calculates an in-focus lens position with reference to the distance acquired by the phase-difference AF method.

In the next Step s306, the microcomputer 118 performs target-lens-movement-calculating processing which determines the target-lens-movement velocity and the target-lens-movement direction with reference to the current lens position and the target lens position. In the subsequent Step s307, the microcomputer 118 determines whether or not the AF evaluation value exceeds a condition (changeover condition) for changeover from the phase-difference AF to the contrast AF. If the AF evaluation value does not exceed the changeover condition, the process proceeds to Step s335. If the AF evaluation value exceeds the changeover condition, the process proceeds to Step s308 where the microcomputer 118 sets the AF mode 2 (contrast AF) Then, the process proceeds to Step s335.

When the process proceeds to Step s309 on the basis of a determination that the phase-difference AF is not set, the process proceeds to Step s309 where the microcomputer 118 determines whether or not the AF mode 2 (contrast AF) is set. If the contrast AF is set, the process proceeds to Step s310, and if not, the process proceeds to Step s315.

When the process proceeds to Step s310 on the basis of a determination that the contrast AF is set, the microcomputer 118 determines whether the AF evaluation value is increased or not (that is, the AF evaluation value is decreased) as compared with the previous AF evaluation value (one cycle before). If the AF evaluation value is increased, the process proceeds to Step s314. If it is decreased, the process proceeds to Step s311 where the microcomputer 118 determines whether or not the AF evaluation value is currently decreased after the passage of the peak position of the AF evaluation value. If the AF evaluation value is decreased after the passage of the peak position, the process proceeds to Step s313, and if not, the process proceeds to Step s312.

In Step s313, the microcomputer 118 sets the AF mode 3 (the lens is stopped at the peak position of the AF evaluation value). Then, the process proceeds to Step s312 where the microcomputer 118 reverses the lens movement direction.

In the next Step s314, the microcomputer 118 performs target-lens-movement-calculating processing which determines the lens movement direction according to the increase or decrease in the AF evaluation value and the lens movement velocity according to the variation amount thereof. Thereafter, the process proceeds to Step s335.

When the microcomputer 118 determines that the current AF mode is not the contrast AF in the above-described Step s309, the process proceeds to Step s315 as described above. Then, in this Step s315, the microcomputer 118 determines whether or not the AF mode 3 (the lens is stopped at the peak position of the AF evaluation value) is set. If the AF mode 3 is set, the process proceeds to Step s316, and if not, the process proceeds to Step s319.

When the process proceeds to Step s316 on the basis of a determination that the AF mode 3 is set, the microcomputer 118 stops the movement of the lens, that is, sets the target-lens-movement velocity to be 0. In the next Step s317, the microcomputer 118 determines whether or not the AF evaluation value or object distance is changed. If the AF evaluation value or object distance is changed, the process proceeds to Step s318 where the microcomputer 118 sets the AF mode 2 (contrast AF), and then the process proceeds to Step s335. Further, if the AF evaluation value and object distance are not changed, the process proceeds directly to Step s335.

As described above, the AF mode transits from 1 to 2 and further to 3, and thereby the AF method is changed over from the phase-difference AF method to the contrast AF method.

When the process proceeds to Step s319 on the basis of a determination that the AF mode 3 is not set in the above-described Step s315, the microcomputer 118 determines whether or not the AF mode 4 (focus-in) is set. If the focus-in is set, the process proceeds to Step s320, and if not, the process proceeds to Step s325.

When the process proceeds to Step s320 on the basis of a determination that the focus-in is set, the microcomputer 118 causes the phase-difference-target-position calculating part 105 to calculate the phase-difference-target lens position from the object distance.

In the next Step s321, the microcomputer 118 acquires the time period (effect time length) for providing the focus-in effect as focus-in time.

In the subsequent Step s322, the microcomputer 118 performs the target-lens-movement-calculating processing for the focus-in which determines the lens movement velocity and the movement direction with reference to the current lens position, the target lens position and the time period for providing the focus-in effect.

For example, as shown in FIG. 4A, the target lens position L0 can be detected from the object distance by the phase-difference AF method. Therefore, the microcomputer 118 can determine the velocity V2 from the current lens position L2 and the focus-in time T1.

Returning to FIG. 7, in the next Step s323, the microcomputer 118 determines whether or not the current lens position is equal to a condition (changeover condition) for changeover from the velocity control to the contrast AF. If the current lens position is not equal thereto, the process proceeds directly to Step s335. Further, if the current lens position is equal thereto, the process proceeds to Step s324 where the microcomputer 118 sets the AF mode 2 (contrast AF) Then, the process proceeds to Step s335.

As with the time T1 shown in FIG. 4A, if the lens position satisfies the changeover condition, the microcomputer 118 changes over the AF mode to the contrast AF. If the above-described changeover condition is set so as to be included in the changeover condition to the contrast AF in Step s307, the changeover from the velocity control to the contrast AF is performed.

As described above, the AF mode transits from 0 to 4, 1, 2 and further to 3, and thereby the changeover from the manual focus to the focus-in and further to hybrid AF is performed.

Figure 7:
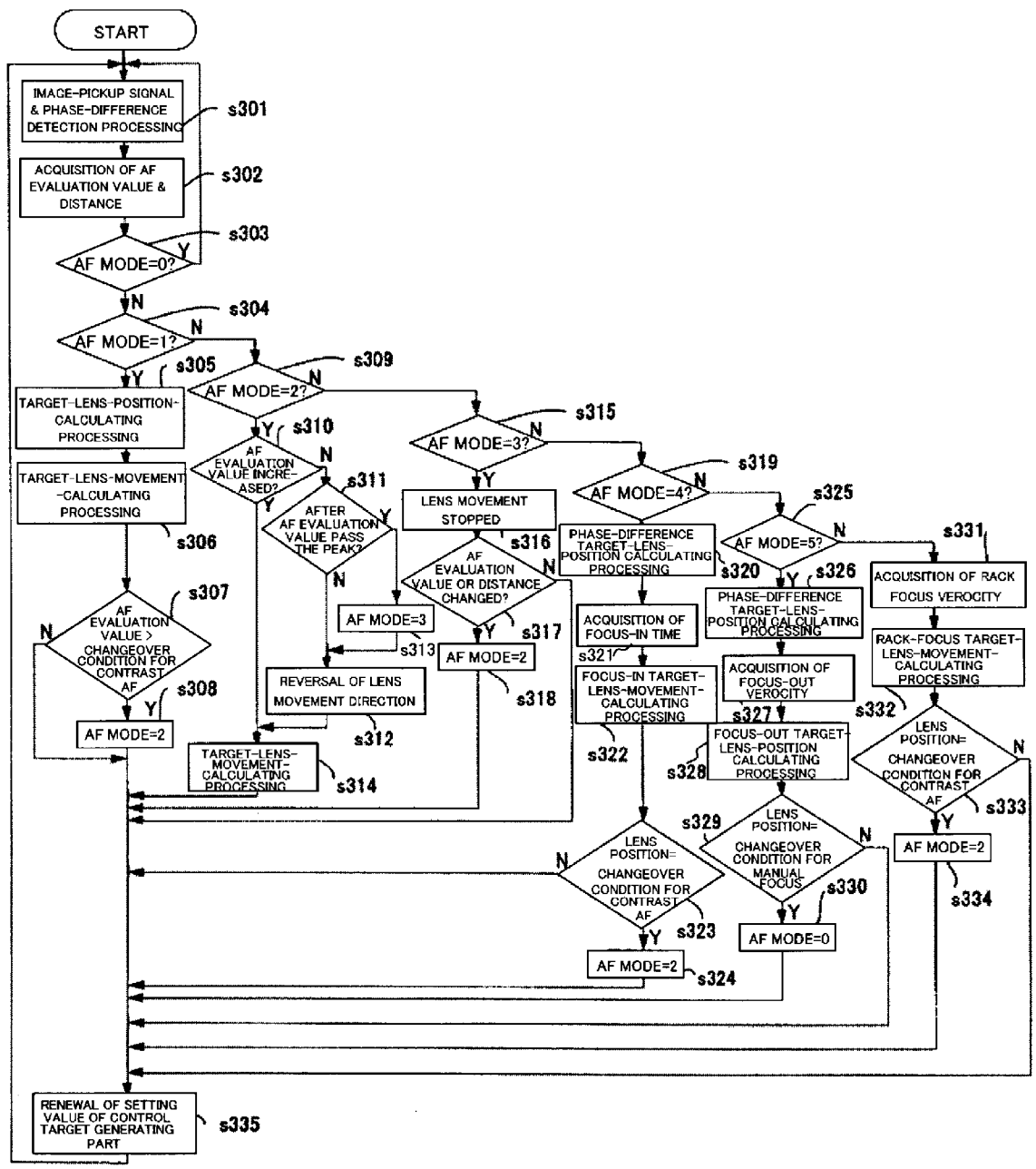
FIG. 7 is a flowchart showing operations in transiting the AF mode of the embodiment.

As shown in FIG. 7, when the process proceeds to Step s325 on the basis of a determination that the AF mode is not the focus-in in Step s319, the microcomputer 118 determines whether or not the AF mode 5 (focus-out) is set. If the AF mode is the focus-out, the process proceeds to Step s326, and if not, the process proceeds to Step s331.

When the process proceeds to Step s326 on the basis of a determination that the AF mode is the focus-out, the microcomputer 118 causes the phase-difference-target-position calculating part 105 to calculate the phase-difference-target lens position from the object distance. In the next Step s327, the microcomputer 118 acquires a lens movement velocity for providing the focus-out effect (focus-out velocity).

In the subsequent Step s328, the microcomputer 118 performs the target-lens-movement-calculating processing for the focus-out which determines the lens movement velocity and the movement direction from the current lens position, the target lens position and the focus-out velocity.

For example, as shown in FIG. 5A, since a defocusing direction can be detected from the current lens position L6 by the phase-difference AF method, the microcomputer 118 can determine the velocity V6 with reference to the focus-out time (effect time length) T1-T0.

In the next Step s329, the microcomputer 118 determines whether or not the current lens position is equal to a condition (changeover condition) for changeover from the focus-out to the manual focus. If the current lens position is not equal thereto, the process proceeds to Step s335. If the current lens position is equal thereto, the process proceeds to Step s330 where the microcomputer 118 sets the AF mode 0 (manual focus), and then the process proceeds to Step s335.

For example, as shown in FIG. 5A, after the lens is moved by a predetermined defocus amount from the current lens position L6, the changeover to the manual focus is performed.

As described above, the AF mode transits from 3 to 5 and further to 0, and thereby the changeover from the state in which the AF evaluation value is at the peak to the AF mode of the focus-out and further to the state waiting for manual focus is performed. Image recording may be finished in conjunction with completion of the focus-out.

If the focus-out is not set in the above-described Step s325, the process proceeds to Step s331 where the microcomputer 118 acquires the velocity for providing the rack focus effect (rack focus velocity). Then, the process proceeds to Step s332 where the microcomputer 118 performs the target-lens-movement-calculating processing for the rack focus which determines the lens movement velocity and the movement direction with reference to the current lens position, the target lens position acquired by the phase-difference AF method and the rack focus velocity.

As shown in FIG. 6A, since the target lens position L12 can be detected in advance from the object distance by the phase-difference AF method, the microcomputer 118 can determine the velocity V11 with reference to the current lens position L11 and the rack focus time (effect time length) T1-T0.

In the next Step s333, the microcomputer 118 determines whether or not the current lens position is equal to a condition (changeover condition) for changeover from the rack focus to the hybrid AF. If the current lens position is not equal thereto, the process proceeds to Step s335. Further, if the current lens position is equal thereto, the process proceeds to Step s334 where the microcomputer 118 sets the AF mode 2 (contrast AF). Then, the process proceeds to Step s335.

As with the time T1 in FIG. 6A, if the lens position satisfies the changeover condition, the AF mode is changed over to the contrast AF. If the above-described changeover condition is set so as to be included in the changeover condition to the contrast AF in Step s307, the changeover from the velocity control to the contrast AF is performed.

As described above, the AF mode transits from 3 to 6, 1, 2 and further to 3, and thereby the changeover from the state in which the AF evaluation value is at the peak to the rack focus and further to the contrast AF is performed.

When the process proceeds to Step s335, the microcomputer 118 renews the velocity, direction and position setting value of the control-target generating part 110. Then, the process returns to Step s301, which is the leading process of the next cycle.

Figure 8:
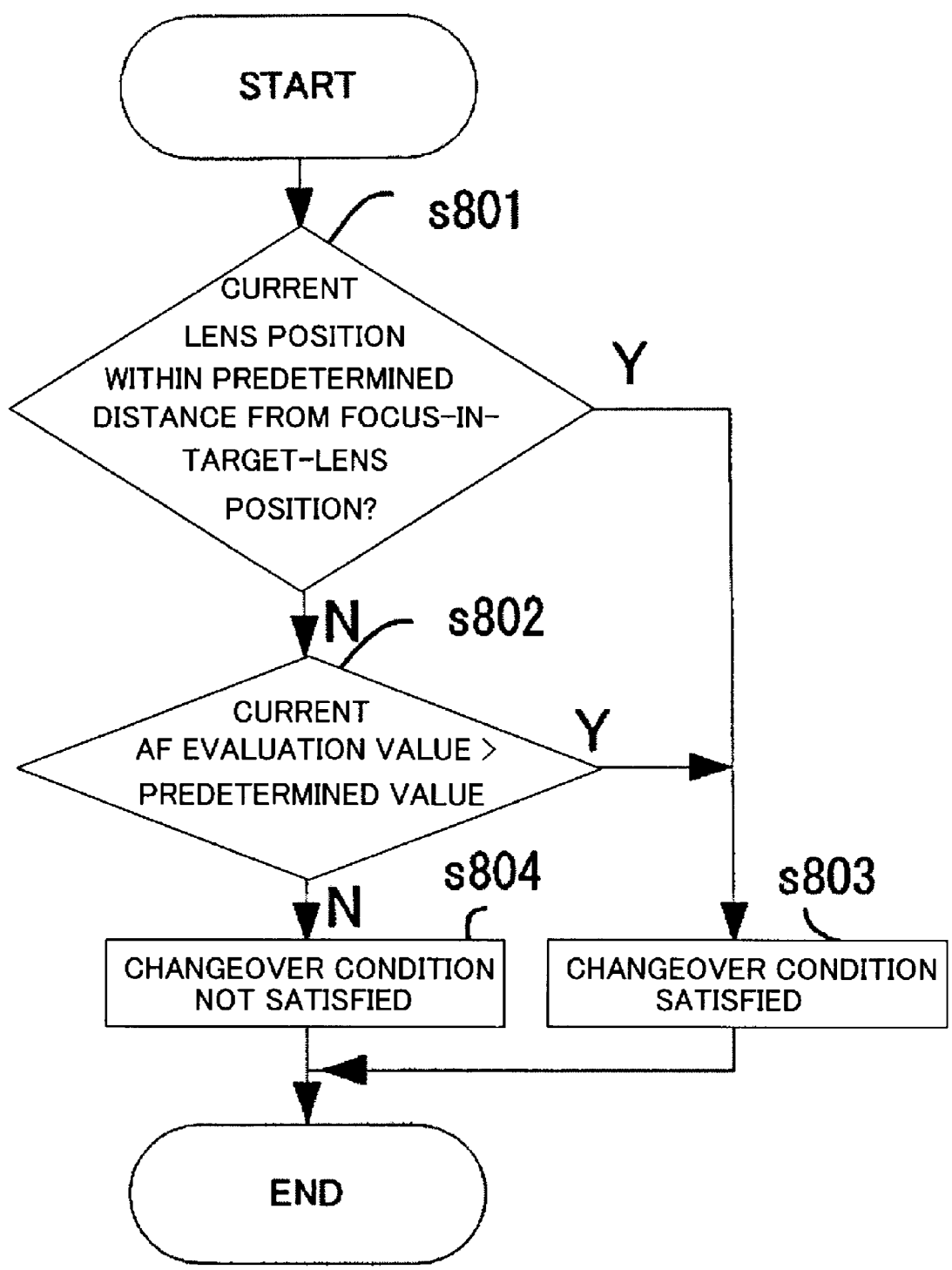
FIG. 8 is a flowchart showing a changeover determination from the focus-in to contrast AF in the embodiment.

FIG. 8 is a flowchart showing example details of determining the changeover condition in Step s323 shown in FIG. 7.

In Step s801, the microcomputer 118 determines whether or not the current lens position comes close within a predetermined distance from the target lens position for the focus-in. If it comes close within the predetermined distance, the process proceeds to Step s803 where the microcomputer 118 determines that the changeover condition is satisfied and completes the processes. On the other hand, if it does not come close within the predetermined distance, the process proceeds to Step s802 where the microcomputer 118 determines whether or not the current AF evaluation value is equal to or more than a predetermined value. If it is equal to or more than the predetermined value, the process proceeds to the above-described Step s803. If it is less than the predetermined value, the process proceeds to Step s804 where the microcomputer 118 determines that the changeover condition is not satisfied and completes the processes.

Figure 9:
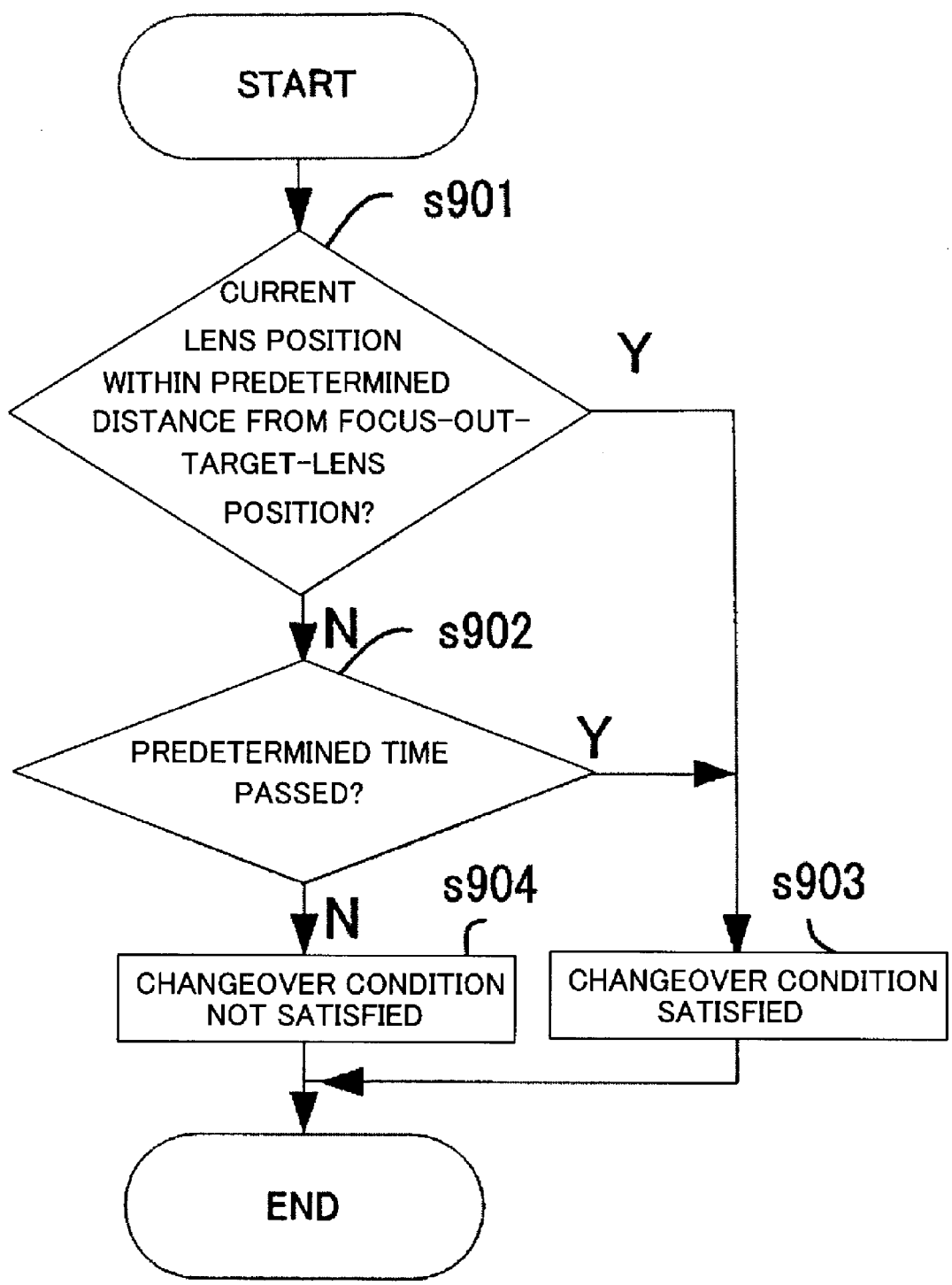
FIG. 9 is a flowchart showing a changeover determination from the focus-out to manual focus in the embodiment.

FIG. 9 is a flowchart showing the details of determining the changeover condition in Step s329 shown in FIG. 7. In Step s901, the microcomputer 118 determines whether or not the current lens position comes close within a predetermined distance from the target lens position for the focus-out. If it comes close within the predetermined distance, the process proceeds to Step s903 where the microcomputer 118 determines that the changeover condition is satisfied and completes the processes. On the other hand, if it does not come close within the predetermined distance, the microcomputer 118 determines in Step s902 whether or not a predetermined time has passed from the start of the focus-out movement. If the predetermined time has passed, the process proceeds to the above-described Step s903. If the predetermined time has not passed, the process proceeds to Step s904 where the microcomputer 118 determines that the changeover condition is not satisfied and completes the processes.

Figure 10:
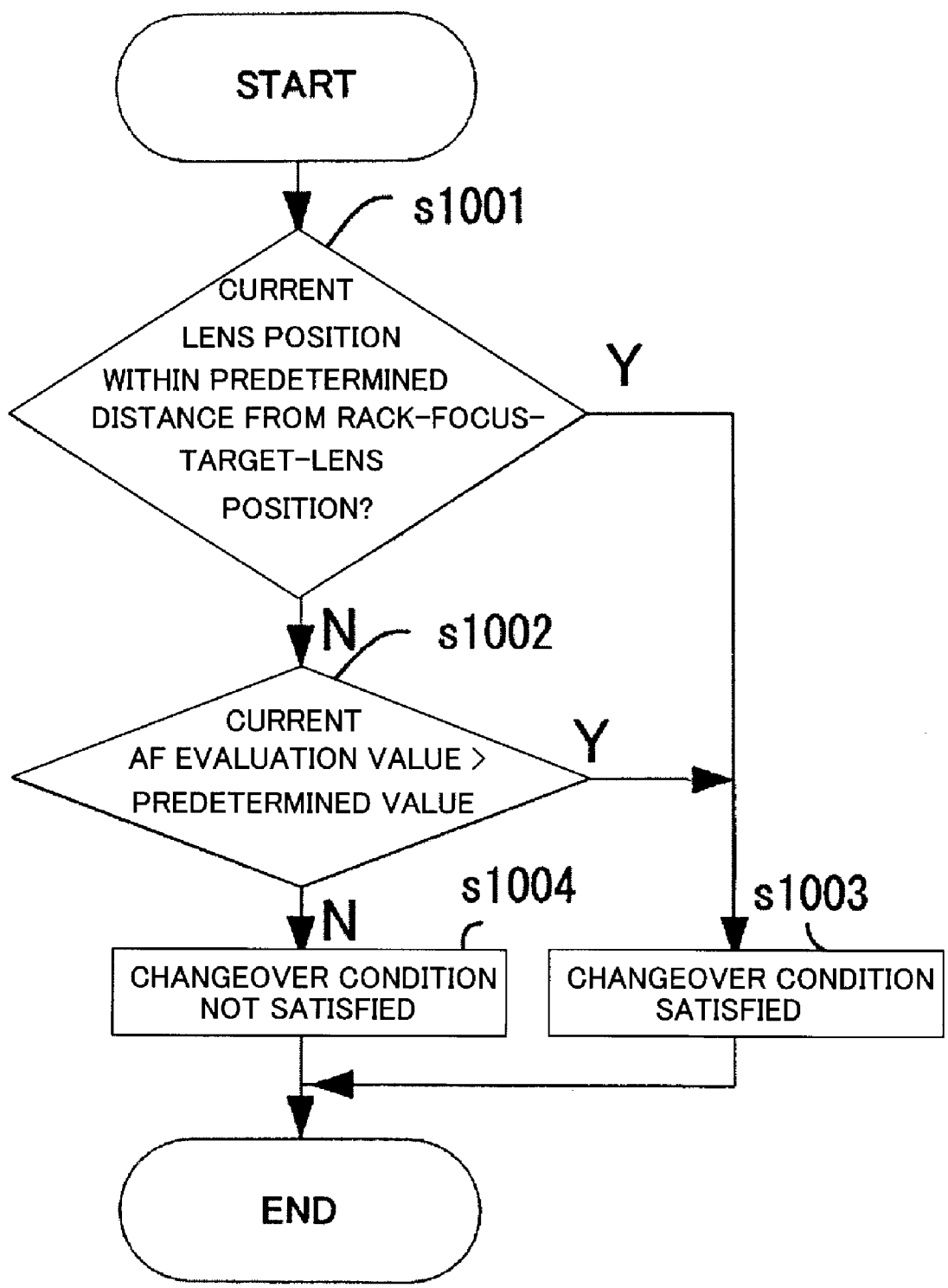
FIG. 10 is a flowchart showing a changeover determination from rack focus to the contrast AF in the embodiment.

FIG. 10 is a flowchart showing the details of determining the changeover condition in Step s333 shown in FIG. 7. In Step s1001, the microcomputer 118 determines whether the current lens position comes close within a predetermined distance from the target lens position for the rack focus. If it comes close within the predetermined distance, the process proceeds to Step s1003 where the microcomputer 118 determines that the changeover condition is satisfied and completes the processes. On the other hand, if it does not come close within the predetermined distance, the process proceeds to Step s1002 where the microcomputer 118 determines whether or not the current AF evaluation value is equal to or more than a predetermined value. If it is equal to or more than the predetermined value, the process proceeds to the above-described Step s1003. If it is less than the predetermined value, the process proceeds to Step s1004 where the microcomputer 118 determines that the changeover condition is not satisfied and completes the processes.

As described above, the microcomputer 118 feeds the information on the object distance in the phase-difference AF method forward to the target lens position for the effect photography and then changes over to the contrast AF.

This enables automatic focus-in under control of any given velocity without storing an in-focus lens position in advance. Similarly, this enables automatic rack focus under control of any given velocity. Further, this enables automatic focus-out in a direction at which defocus is inevitably generated.

Moreover, this embodiment enables to output a warning at the point of starting image pickup where the rack focus or focus-in photography cannot be performed because an object moves to disappear from the image-pickup area. Furthermore, this embodiment enables to output a warning at the point of starting image pickup where the focus-out photography cannot be performed because objects are increased in number.

The above-described embodiment determines, based on the object distance detection with a distance detector for the phase-difference AF method, the lens movement direction in which an in-focus state is achieved and the lens movement velocity and then changes over to the contrast AF after completion of the lens movement. This enables to perform the focus-in and rack focus in a constant time, without being influenced by the object contrast or the lens position.

Further, the above-described embodiment determines, based on the object distance detection with the distance detector for the phase-difference AF method, the defocusing lens movement direction and the movement velocity and then to changes over to the manual focus after completion of the lens movement. This enables to perform the focus-out in a constant time without being influenced by the object contrast or the lens position. Also, the above-described embodiment enables to determine whether or not the object satisfies the condition for performing the focus-in, rack focus and focus-out, prior to performing the effect photography.

Furthermore, the present invention is not limited to these preferred embodiments and various variations and modifications may be made without departing from the scope of the present invention.

This application claims foreign priority benefits based on Japanese Patent Application No. 2006-219818, filed on Aug. 11, 2006, which is hereby incorporated by reference herein in its entirety as if fully set forth herein.

What is claimed is:

1. An image-pickup apparatus comprising:
a signal generator which generates a focus evaluation signal corresponding to contrast of an image from an output signal of an image-pickup element;
a detector which detects information corresponding to an object distance; and
a controller which controls a focus lens on the basis of the focus evaluation signal,
wherein a focus-effect function is effectuated by the controller controlling a velocity and a direction of moving of the focus lens in accordance with an instruction of focus-out or focus-in so that the focus lens moves to a second position from a first position during a constant predetermined time period,
wherein the first position is a current position of the focus lens, and the second position is a detected position on the basis of the information corresponding to the object distance, and
wherein the focus-effect function is realized in the constant predetermined time period without being influenced by the contrast of the image or the position of the focus lens.

2. An image-pickup apparatus according to claim 1, wherein, in a case where focus-in is selected as the focus-effect function,
the controller determines, in an out-of-focus state, a movement amount of the focus lens up to the in-focus position with reference to the information corresponding to the object distance and the current position of the focus lens and causes the focus lens to move from the current position to the in-focus position at a constant movement velocity determined from the movement amount and an effect time length, and
the controller changes over from the focus lens control on the basis of the information corresponding to the object distance to the focus lens control on the basis of the focus evaluation signal in response to satisfaction of a predetermined condition during the movement of the focus lens.

3. An image-pickup apparatus according to claim 2, wherein the predetermined condition is that the focus evaluation signal exceeds a predetermined level.

4. An image-pickup apparatus according to claim 2, wherein the predetermined condition is that the position of the focus lens falls within a predetermined distance range to the in-focus position.

5. An image-pickup apparatus according to claim 1, wherein, in a case where focus-out is selected as the focus-effect function,
the controller determines, in an in-focus state, a movement amount of the focus lens up to an out-of-focus position with reference to the information corresponding to the object distance and the current in-focus position of the focus lens and causes the focus lens to move from the in-focus position to the out-of-focus position at a constant movement velocity determined from the movement amount and an effect time length, and
the controller changes over from a state in which the focus lens control is performed on the basis of the information corresponding to the object distance to a state in which manual focusing is allowed in response to satisfaction of a predetermined condition during the movement of the focus lens.

6. An image-pickup apparatus according to claim 5, wherein the predetermined condition is that the position of the focus lens falls within a predetermined distance range to the out-of-focus position.

7. An image-pickup apparatus according to claim 5, wherein the predetermined condition is that a predetermined time has elapsed after the movement of the focus lens in an out-of-focus direction is started.

8. An image-pickup apparatus according to claim 1, wherein, in a case where rack focus is selected as the focus-effect function, the controller determines, in an in-focus state, a movement amount of the focus lens up to an in-focus position adjacent to the current in-focus position with reference to the information corresponding to the object distance and the current position of the focus lens and causes the focus lens to move from the current in-focus position to the adjacent in-focus position at a constant movement velocity determined from the movement amount and the effect time length, and
the controller changes over from the focus lens control on the basis of the information corresponding to the object distance to the focus lens control on the basis of the focus evaluation signal in response to satisfaction of a predetermined condition during the movement of the focus lens.

9. An image-pickup apparatus according to claim 8, wherein the predetermined condition is that the focus evaluation signal exceeds a predetermined level.

10. An image-pickup apparatus according to claim 8, wherein the predetermined condition is that the position of the focus lens falls within a predetermined distance range to the adjacent in-focus position.

11. An image-pickup apparatus according to claim 1, wherein, the information detected by the detector is a phase-difference signal representing a phase-difference amount of two object images, wherein the two images are formed with two divided light fluxes from the object.

* * * * *